United States Patent [19]

Scheder et al.

[11] Patent Number: 4,651,472
[45] Date of Patent: Mar. 24, 1987

[54] METHOD OF AND MACHINE FOR GRINDING ROTARY WORKPIECES

[75] Inventors: Dietmar Scheder, Leinfelden-Echterdingen; Georg Haug, Neckartailfingen, both of Fed. Rep. of Germany

[73] Assignee: Schaudt Maschinenbau GmbH, Stuttgart, Fed. Rep. of Germany

[21] Appl. No.: 767,417

[22] Filed: Aug. 20, 1985

[30] Foreign Application Priority Data

Sep. 3, 1984 [DE] Fed. Rep. of Germany ....... 3432306

[51] Int. Cl.[4] .......................... B23C 3/05; B24B 5/00; B24B 17/00
[52] U.S. Cl. ............................... 51/105 R; 51/215 R; 51/165.88; 51/165.73; 51/289 R
[58] Field of Search .......... 51/105 R, 215 CP, 215 H, 51/215 E, 215 M, 165.88, 165.87, 289 R, 165.73, 165.91, 165 R, 165.83

[56] References Cited

U.S. PATENT DOCUMENTS 4,038,785 8/1977 Scott ............................... 51/215 CP
4,539,777 9/1985 Brown et al. ..................... 51/165.73

Primary Examiner—Frederick R. Schmidt
Assistant Examiner—Maurina Rachuba
Attorney, Agent, or Firm—Peter K. Kontler

[57] ABSTRACT

The grinding of successive workpieces in a surface grinding machine with automatic transport of workpieces to and from the grinding station is interrupted at preselected intervals to replace the workpiece at the grinding station with a pattern which is contacted by the sensors of a measuring device serving as a means for monitoring the diameters of workpieces in the course of the grinding operation. The thus obtained signals are indicative of the wear upon the sensors and are used as reference signals for the treatment of the next series of workpieces. The work transporting device is used to convey the pattern between the grinding station and a depository wherein the pattern is cooled during storage by the medium which is used to cool workpieces during treatment at the grinding station.

21 Claims, 4 Drawing Figures

METHOD OF AND MACHINE FOR GRINDING ROTARY WORKPIECES

BACKGROUND OF THE INVENTION

The present invention relates to the art of grinding in general, and more particularly to improvements in methods and machines for grinding rotary workpieces. Still more particularly, the invention relates to improvements in a method of and in a (circular or surface) grinding machine for removing material from the peripheral or internal surfaces of rotating workpieces.

It is known to equip a surface grinding machine with automatic work inserting and removing means and with means for at least intermittently monitoring the diameter and/or other dimensions of the workpiece at the grinding station so as to allow for immediate changes in the mode of operation if the monitored dimension or dimensions deviates or deviate from a desired or optimum value. It is also known to provide a surface grinding machine with means for ascertaining the condition and the accuracy of the monitoring means so as to avoid the making of longer or shorter series of ultimate products whose dimensions deviate from a desired value. As a rule, the monitoring means (e.g., a standard measuring head with two or more work-contacting sensors) is calibrated with a pattern which is a replica of a finished workpiece and whose dimensions match the desired or optimum values. Signals which are generated by the monitoring means during scanning of a workpiece as well as during scanning of a pattern are transmitted to the control circuit of the grinding machine for evaluation and for the carrying out of adjustments, if necessary. The aforedescribed mode of operation can be relied upon irrespective of whether the machine employs one or more grinding tools.

Continuous monitoring of workpieces during removal of material therefrom in a grinding machine is desirable and advantageous if the workpieces are to be treated with a high or extremely high degree of precision. For example, such workpieces can constitute camshafts for use in internal combustion engines or for other purposes. Frequent monitoring of the dimensions of workpieces during removal of material is particularly important and desirable when the grinding machine is set up to turn out long series of identical workpieces, i.e., when the intervals for changes of setup are infrequent and the machine could turn out large numbers of defective products including rejects during an interval between stops which take place for the purpose of allowing a changeover to treatment of different types of workpieces. Presently known numerical and other automatic ontrols of a modern high-speed surface grinding machine are capable of immediately evaluating the signals which are generated by the monitoring means and of immediately adjusting the machine if the monitored dimensions of a workpiece deviate from standard or optimum dimensions.

The sensors which are used in a measuring head to ascertain the dimensions of a workpiece at the grinding station are subjected to extensive wear since they come into contact with a rotating part which is in the process of being treated by one or more grinding wheels. The accuracy of measurement decreases with progressing wear upon the sensors so that, in the absence of any remedial action, the machine could turn out large numbers of defective products. This is the reason for the utilization of the aforediscussed pattern which is contacted by the sensors from time to time in order to ascertain whether or not the sensors are still capable of furnishing accurate signals such as are required in the course of a particular type of grinding operation.

German Offenlegungsschrift No. 31 36 443 discloses a method of and an apparatus for zero setting the measuring head in a circular grinding machine. The grinding machine which is disclosed in this German printed publication comprises a measuring head which is pivotable into engagement with a measuring pin mounted on the machine within the range of movements of the measuring head. Signals which are generated in response to engagement between the measuring head and the measuring pin are used to effect a zero setting for (i.e., to select the starting position of) the measuring head. The just discussed machine exhibits the drawback that the measuring pin cannot be placed at a substantial distance from the grinding station, i.e., it must be located within the range of the sensors of the measuring head. Therefore, the pin is frequently in the way and adversely affects the accessibility of the measuring station. Moreover, the measuring pin is located in the space for sprays of water which is caused to cool the workpiece during removal of material by one or more grinding wheels. The liquid medium carries particulate and other contaminants which deposit and incrustate on the measuring pin and thus affect the accuracy of adjustment of the measuring head when the latter is caused to place its sensors into contact with the thus contaminated measuring pin.

OBJECTS AND SUMMARY OF THE INVENTION

An object of the invention is to provide a novel and improved method of calibrating the work monitoring or measuring device in a surface grinding machine or another machine tool.

Another object of the invention is to provide a method which is reliable for any desired period of time because the results of the calibrating or testing operation cannot be affected by sprays of liquid or any other contaminants.

A further object of the invention is to provide a method which can be practiced to ensure highly accurate calibration of available work measuring or monitoring devices.

An additional object of the invention is to provide a method which allows for rapid calibration of the monitoring device at desired intervals.

Still another object of the invention is to provide a method which ensures highly accurate calibration of the work monitoring device without requiring any attention on the part of the attendants and which renders it possible to properly calibrate a wide variety of presently known and utilized monitoring devices.

Another object of the invention is to provide a method of the above outlined character which can be practiced with relatively simple surface grinding machines and other types of machine tools without interfering with the convenience of access to the material removing station or stations.

An additional object of the invention is to provide a novel and improved calibrating or testing system which can be incorporated in surface grinding and like machines to replace the heretofore known testing systems and which ensures more accurate, shorter-lasting and fully or partially automated calibration of many presently used or specially designed work monitoring devices.

Another object of the invention is to provide a surface grinding machine which embodies the above outlined calibrating system.

A further object of the invention is to provide novel and improved means for transporting workpieces and other parts in an automatic surface grinding machine.

Still another object of the invention is to provide a surface grinding machine with a novel and improved arrangement for supporting a pattern in a predetermined position for transport within the confines of the machine at selected intervals.

An additional object of the invention is to provide a novel and improved depository for a pattern in a surface grinding machine or an analogous machine tool.

A further object of the invention is to provide a depository which can be installed in existing surface grinding and like machines.

One feature of the present invention resides in the provision of a method of grinding the round surfaces of rotary workpieces at the grinding station of a surface grinding machine. The method comprises the steps of transporting to and from the grinding station a succession of untreated and treated workpieces along at least one predetermined path, monitoring the dimensions of at least some workpieces at the grinding station including scanning such workpieces by at least one sensor of a work monitoring or measuring device, and testing or calibrating the measuring device at preselected intervals including delivering to the grinding station a pattern whose dimensions match the desired or optimum dimensions of treated workpieces, contacting the pattern with the one sensor and generating signals denoting the position of the one sensor during contact with the pattern. The method further comprises the step of establishing for the pattern a depository at a predetermined distance from the grinding station. The delivering step then preferably comprises conveying the pattern from the depository to the grinding station, and the method further comprises the step of returning the pattern from the grinding station to the depository upon completion of the signal generating step. The transporting, conveying and returning steps are preferably performed automatically in response to signals from the control system of the surface grinding machine. The depository for the pattern is preferably adjacent to a predetermined portion of the path along which the workpieces are advanced to and/or from the grinding station. The depository can be adjacent (a) to a portion of the path along which the workpieces advance toward the grinding station, (b) to a portion of the path along which the workpieces advance from the grinding station, or (c) to a portion of the path along which the workpieces advance toward as well as away from the grinding station.

The method preferably further comprises the step of maintaining the temperature of the pattern in the depository within a predetermined range. Still further, the method preferably comprises a step of monitoring the depository for the presence or absence of the pattern prior to the conveying step as well as of monitoring the position of the pattern in the depository prior to the conveying step.

In accordance with a presently preferred embodiment of the invention, the transporting step comprises advancing untreated workpieces toward and advancing treated workpieces away from the grinding station along a predetermined path a portion of which is adjacent to the depository. The testing step then further comprises advancing a selected untreated workpiece along the path and temporarily storing the selected untreated workpiece in the depository preferably not later than upon completion of the first stage of the conveying step, withdrawing the freshly treated workpiece from the grinding station preferably not later than immediately upon completion of the conveying step, advancing the freshly treated workpiece to the depository while the pattern is located at the grinding station, withdrawing the selected untreated workpiece from the depository, introducing the freshly treated workpiece into the depository, advancing the withdrawn selected workpiece from the depository to the grinding station, replacing the pattern with the selected untreated workpiece, extracting the freshly treated workpiece from the depository not later than upon completion or in the course of the returning step, and advancing the freshly treated workpiece along the predetermined path in a direction away from the grinding station. The removal of a selected workpiece from and the insertion of the freshly treated workpiece into the depository preferably take place in the course of the contacting step. The method can further comprise the step of utilizing the signals for controlled grinding of the selected workpiece and of the next following workpiece or workpieces.

Another feature of the invention resides in the provision of a circular grinding machine which comprises a tool holder and a work holder which together define a grinding station, means for transporting a series of rotary workpieces to and from the work holder so that successive workpieces are treated at the grinding station by one or more tools mounted in the tool holder, a measuring device which comprises sensor means serving to monitor the dimensions of at least some workpieces of the series in the work holder and to generate signals denoting the dimensions of the monitored workpieces, a pattern whose dimensions match the desired or optimum dimensions of treated workpieces, and means for conveying the pattern to and from the work holder subsequent to treatment of preselected numbers of workpieces and in lieu of an untreated workpiece so that the dimensions of the pattern can be monitored by the sensor means while the pattern is located in the work holder and the signals which are generated by the sensor means as a result of monitoring of the pattern can be compared with signals denoting the dimensions of treated workpieces. The conveying means preferably forms part of the transporting means or vice versa.

The transporting means preferably defines a predetermined path for the workpieces, and the machine further comprises a depository for the pattern. Such depository is preferably adjacent to a predetermined portion of the path. The depository preferably comprises means for locating the pattern in a predetermined position, and the machine preferably further comprises control means for regulating the operation of the transporting means and the frequency at which the pattern is conveyed from the depository to the work holder. The sensor means is arranged to transmit signals to the control means.

In accordance with a presently preferred embodiment of the improved grinding machine, the depository comprises a vessel for the pattern, and such machine further comprises means for circulating a coolant through the vessel so that the pattern is maintained at a predetermined temperature while it is located in the vessel. The circulating means preferably includes means for cooling the workpiece which is held by the work holder. The means for locating the pattern in the depository is preferably designed to maintain the pattern in such orientation that the axis of rotation of the pattern is parallel to or coincides with the axis of rotation of the workpiece which is mounted in the work holder. The pattern can comprise an actuator, and the depository then preferably comprises or is adjacent to detector means which is designed to generate signals in response to detection of the actuator in the depository. The detector means can be designed to generate signals only when the pattern assumes its predetermined position. The detector means generates signals only when the actuating means, and hence the entire pattern, is maintained in a predetermined position with reference to the vessel of the depository. The actuating means can comprise an annular member (e.g., a flange) on the pattern and the detector means can include a proximity detector.

The transporting means preferably comprises elongated guide means which defines the aforementioned path, and a vehicle (such as a trolley) which is arranged to travel along the guide means. A portion of the path is or can be at least substantially parallel to the axis of rotation of that workpiece which is located at the grinding station, i.e., which is held by the work holder. The vehicle preferably comprises a plurality of mobile grippers or claws each of which is arranged to releasably hold a workpiece and at least one of which can also releasably hold the pattern. The vehicle further comprises means for moving at least one of the grippers at least substantially radially of the axis of the workpiece which is held by the work holder. Such machine preferably further comprises a source of untreated workpieces, and the source is preferably adjacent to a predetermined portion of the path, for example, at or close to a maximum distance from the grinding station. Still further, the machine preferably comprises means for receiving treated or finished workpieces from the vehicle, and such receiving means is also adjacent to a predetermined portion of the path. The receiving means for treated workpieces and the source of untreated workpieces can be located next to each other at one end of the path, and the grinding station can be located at the other end of the path. The path is preferably located at a level above the grinding station so that the vehicle can transport the pattern and/or the workpieces in suspended position.

The grinding machine further comprises control means which receives signals from the sensor means and includes means for regulating the operation of the drive means for the vehicle. The vehicle is preferably designed to deliver untreated workpieces to and from the grinding station and the depository, to deliver treated workpieces to and from the grinding station and the depository, and to convey the pattern between the grinding station and the depository. At least a portion of the path is preferably straight. For example, the entire path can be a substantially straight path a first portion of which extends between the source and receiving means on the one hand and the depository on the other hand and a second portion of which extends between the depository and the grinding station.

The novel features which are considered as characteristic of the invention are set forth in particular in the appended claims. The improved surface grinding machine itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
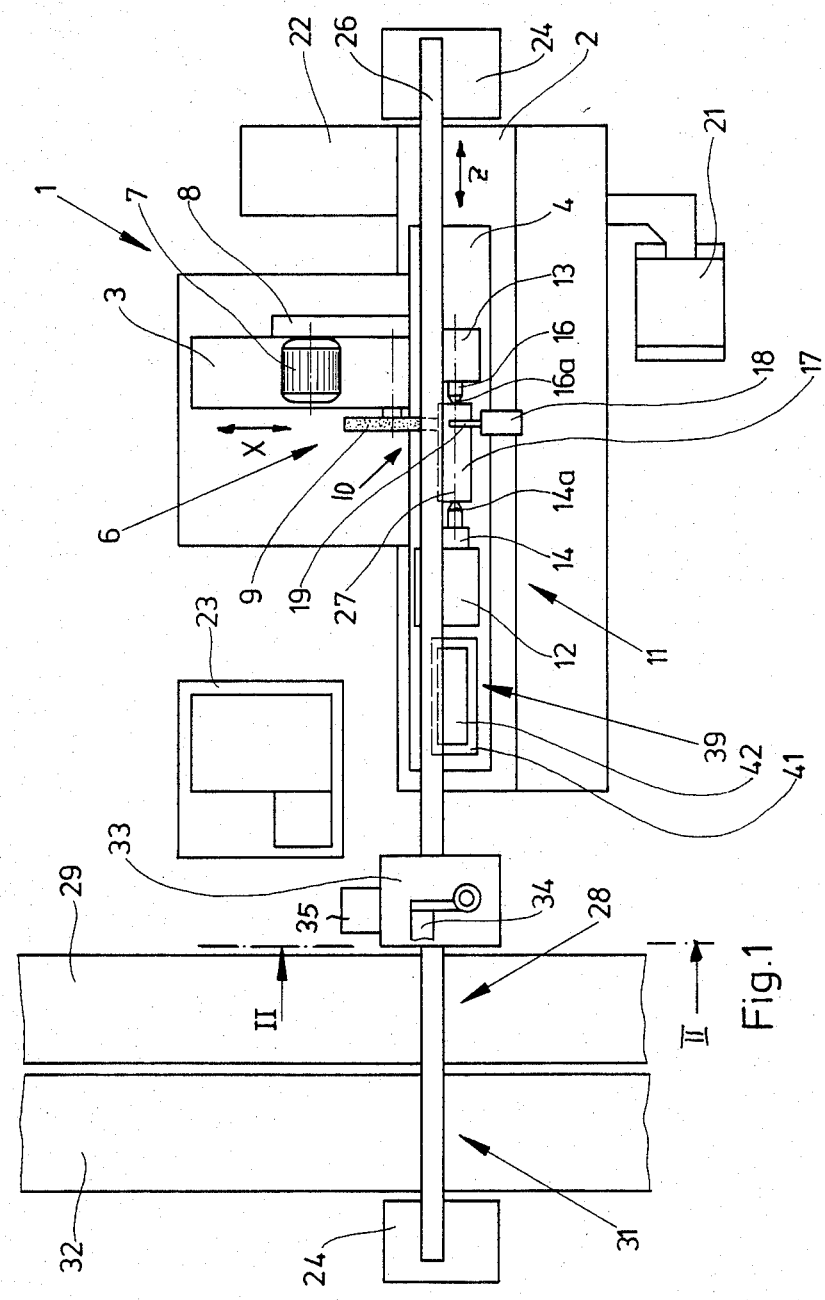
FIG. 1 is a diagrammatic plan view of a portion of a surface grinding machine which embodies one form of the present invention.
Figure 2:
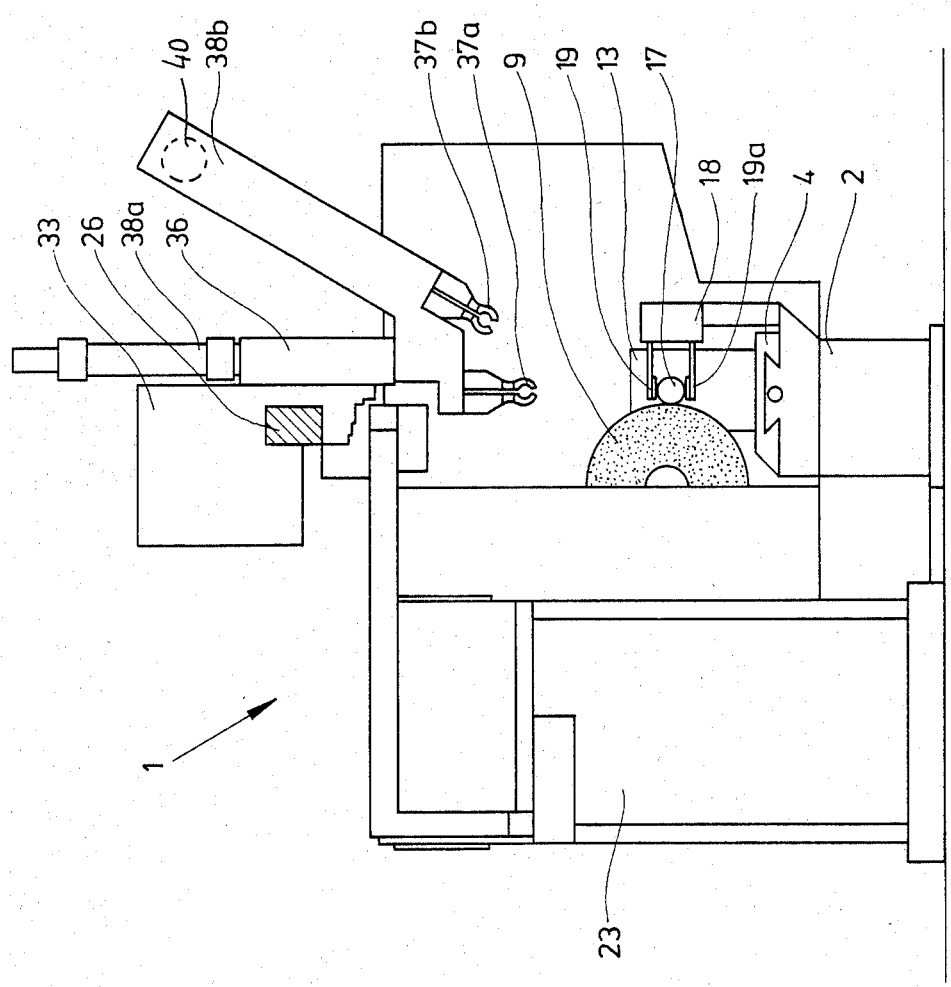
FIG. 2 is a vertical sectional view as seen in the direction of arrows from the line II—II of FIG. 1.

Referring first to FIGS. 1 and 2, there is shown a circular or surface grinding machine 1 which comprises a base or bed 2 for a tool holder 3 which is movable on the bed in at least one direction, preferably back and forth as indicated by the double-headed arrow X. The bed 2 further supports a carriage or table 4 which is reciprocable in directions indicated by the arrow Z. The tool holder 3 comprises a tool spindle 6 which is driven by a prime mover 7 (e.g., a variable-speed electric motor) through the medium of a transmission 8. The spindle 6 supports and transmits torque to at least one removable wheel-shaped grinding tool 9. In the illustrated embodiment of the grinding machine, the axis of the spindle 6 is parallel to the axis 27 of the workpiece 17 at the grinding station 10 and extends at right angles to the directions which are indicated by the arrow X. If desired or necessary, the tool holder 3 can be mounted on a first carriage (not shown) which is reciprocable in directions indicated by the arrow Z, and the first carriage can be movably mounted on a second carriage which is reciprocable in directions indicated by the arrow X.

The carriage or table 4 supports a work holder or work clamping unit 11 which includes a headstock 12 and a tailstock 13. The headstock 12 is or can be fixedly secured to the carriage 4, and the tailstock 13 is reciprocable on the carriage 4 in directions which are indicated by the arrow Z. This enables the work holder 11 to accept relatively short or longer workpieces 17. The means for rotating the workpiece 17 at the grinding station 10 comprises a work spindle 14 which forms part of or is installed in the headstock 12 and includes a pointed center 14a in engagement with the adjacent end portion of the workpiece. The other end portion of the workpiece 17 at the grinding station 10 is engaged by the pointed center 16a of the tailstock quill 16.

The means for at least intermittently monitoring certain dimensions (particularly the diameters) of workpieces 17 which are in the process of being treated at the grinding station 10 comprises a measuring device or head 18 which is mounted on the bed 2 and includes two signal generating sensors 19 and 19a serving to contact the rotating workpiece which is mounted in the work holder 11 and to transmit appropriate signals to the control unit 21 of the grinding machine 1. The control unit 21 is designed to transmit signals to all or practically all mobile parts of the grinding machine 1, such as the prime mover 7, the means (not specifically shown) for intermittently or continuously dressing the tool or tools 9, means for transporting workpieces 17 to and from the grinding station 10, means for moving the tailstock 13 relative to the headstock 12, means for driving the spindle 14, means for moving the work holder 3 and the carriage 4 relative to the bed 2, means for initiating the spraying of a suitable coolant onto the workpiece 17 at the station 10, and others. A switchgear cabinet 22 is provided for the electrical and electronic components which serve to supply electrical energy to electrically operated parts of the grinding machine, and a second cabinet 23 is provided to confine the control elements for the hydraulic and/or pneumatic components which are needed in the machine. The exact construction of the cabinets 22, 23 and of their contents forms no part of the invention.

The grinding machine 1 of FIGS. 1 and 2 further comprises means for automatically transporting workpieces 17 to and from the grinding station 10, i.e., to and from a position for engagement by the parts 12 and 13 of the work holder 11. The transporting means comprises an elongated horizontal straight overhead guide rail 26 whose end portions are supported by columns 24 and which is at least substantially parallel to the axis 27 of the workpiece 17 at the grinding station 10, and a work transporting vehicle or trolley 33 which is reciprocable along the guide rail 26 at a level above the major part of the machine 1 (see FIG. 2). The trolley 33 is reciprocable between the grinding station 10 (i.e., between the work holder 11) and a work removing unit 31 which is adjacent to the left-hand end portion (as viewed in FIG. 1) of the elongated path defined by the guide rail 26. The unit 31 comprises one or more suitable conveyors (FIG. 1 shows a portion of a simple belt conveyor 32) serving to accept and to remove finished workpieces 17, i.e., to remove those workpieces whose treatment at the station 10 has been completed and which are to be delivered to storage or to a further processing station, not shown. Another portion of the path which is defined by the guide rail 26 is adjacent to a work supplying unit 28 which includes one or more endless or otherwise designed conveyors (FIG. 1 shows a portion of a simple belt conveyor 29) serving to deliver a succession of untreated workpieces 17 into the range of the trolley 33 while the latter is on its way from the station for the work removing unit 31 (where it has deposited a freshly treated workpiece) toward the grinding station 10 for delivery of an untreated workpiece to the work holder 11. The means for supplying untreated workpieces 17 to the conveyor or conveyors 29 of the work supplying unit 28 is not shown because its design forms no part of the present invention.

The drive means 35 for moving the trolley 33 along the guide rail 26 at preselected intervals and through preselected distances receive appropriate signals from the control unit 21. The electrically operated parts on the trolley 33 receive energy from the cabinet 22 through a cable band 34.

The trolley 33 includes a support 36 for two arms 38a, 38b which respectively carry mobile grippers or claws 37a and 37b. The grippers 37a and 37b are movable substantially radially of the axis 27 of the workpiece 17 at the grinding station 10 to engage or to release the workpiece. The means for moving the grippers 37a, 37b along straight paths relative to the respective arms 38a, 38b comprises suitable reversible electric motors 40 (only one shown) in the arms 38a, 38b and ball screw drives or other means for transmitting motion from the motors to the respective grippers. The exact construction of the means for moving the grippers 37a, 37b relative to the support 36 of the trolley 33 forms no part of the present invention. All that counts is to ensure that the grippers 37a, 37b can engage or release a workpiece 17 at the station 10, in the region of the work receiving unit 31 and in the region of the work supplying unit 28 as well as to perform certain additional functions which will be explained below.

Figure 3:
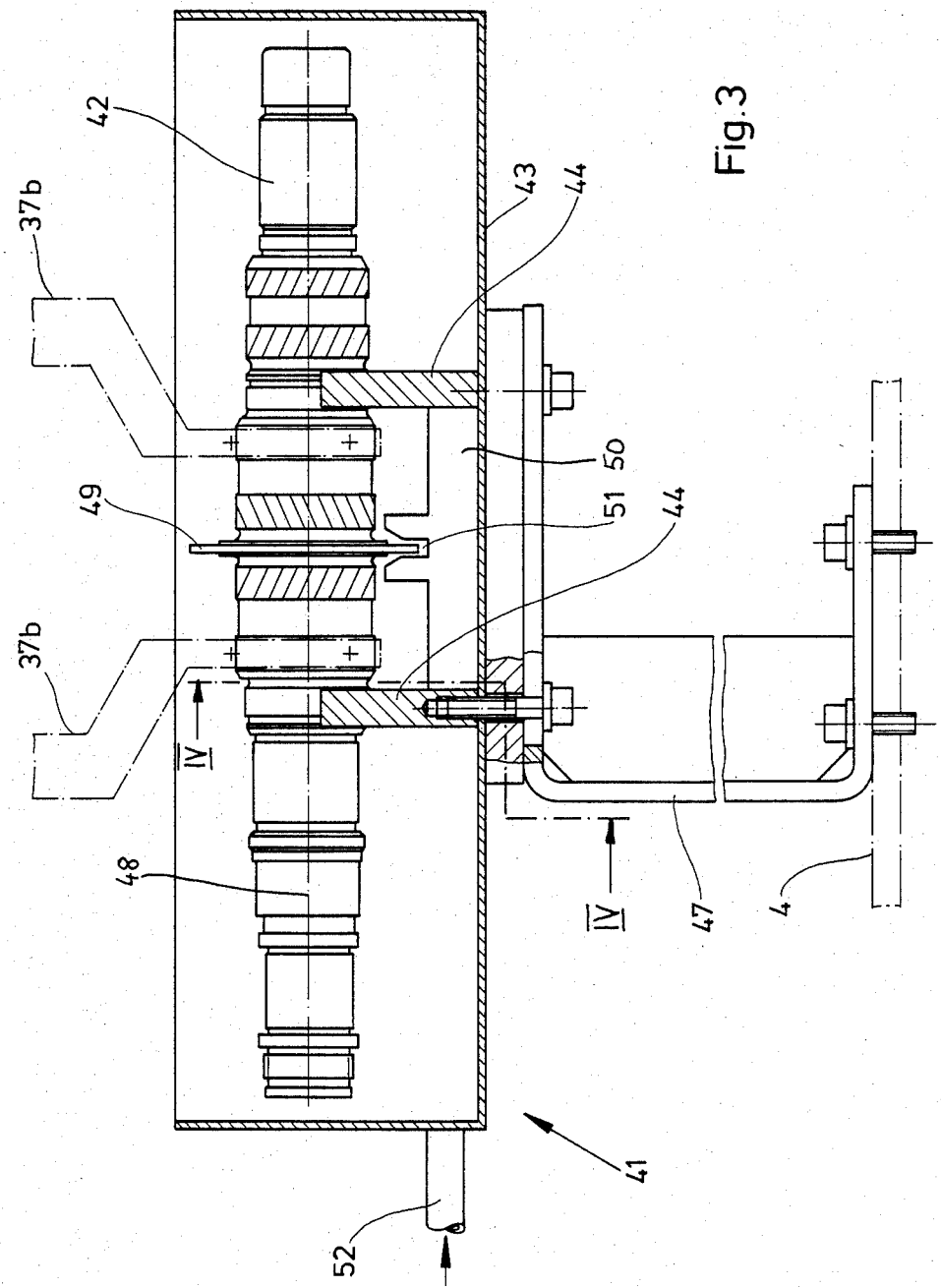
FIG. 3 is a longitudinal sectional view of the depository for the pattern.
Figure 4:
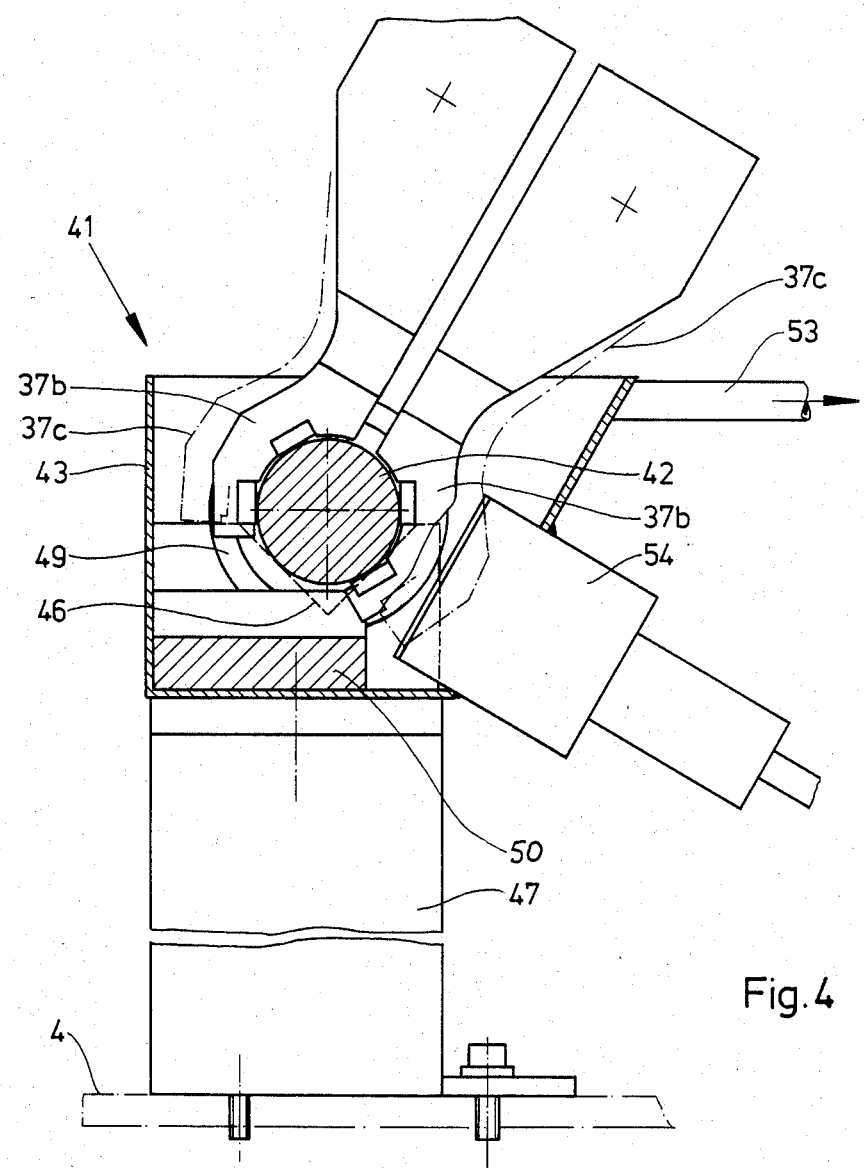
FIG. 4 is a transverse vertical sectional view as seen in the direction of arrows from the line IV—IV in FIG. 3.

In accordance with a feature of the invention, the grinding machine 1 further comprises a locating station 39 which occupies a portion of the path that is defined by the guide rail 26 and accommodates a depository 41 for a pattern 42, namely for a model workpiece which is used, at preselected intervals, for calibration or testing of the measuring device 18. The exact construction of the depository 41 is shown in FIGS. 3 and 4; it comprises a vessel or pan 43 which is partially or substantially completely filled with a fluid medium so as to ensure that the pattern 42 is maintained at a preselected temperature preferably corresponding to the temperature of the workpiece 17 at the grinding station 10. The vessel 43 contains two spaced-apart parallel supports 44 with V-shaped notches 46 (one shown in FIG. 4) for portions of the pattern 42 so that the latter isheld in a predetermined orientation and is ready for engagement by one of the grippers 37a, 37b. When it is properly inserted into the vessel 43, the pattern 42 is preferably held in such orientation that its axis 48 is parallel to or coincides with the axis 27 of the workpiece 17 which is mounted in the work holder 11.

The notches 46 of the supports 44 ensure that the pattern 42 is maintained in the aforementioned orientation, i.e., so that its axis 48 coincides with or is parallel to the axis 27 of the workpiece 17 at the station 10. In addition, the depository 41 preferably comprises positioning means for ensuring that the pattern in the vessel 43 is held in a predetermined axial position. Such positioning means comprises an annular flange 49 which is provided on the pattern 42 and constitutes an actuating means or trip for a proximity detector 54 which serves to transmit appropriate signals to the control unit 21 as soon as the pattern 42 is properly located in the vessel 43. At such time, the flange 49 is received in the centering gap 51 of a beam 50 which is installed in the vessel 43 between the supports 44.

The means for maintaining the pattern 42 in the vessel 43 at a predetermined temperature or within a predetermined temperature range preferably forms part of the cooling system of the grinding machine 1. FIG. 3 shows a supply conduit 52 which admits a stream of liquid coolant (e.g., water) into the lower portion of the vessel 43, and FIG. 4 shows a second conduit or overflow pipe 53 which communicates with the upper portion of the vessel 43 and is located at a level such that the liquid coolant in the vessel at least partially but preferably completely surrounds the properly oriented and positioned pattern 42. The pump which causes the coolant to flow from a suitable source to and through the conduit 52 is not shown in the drawing. The coolant circulating system including the conduits 52 and 53 is preferably the same system which sprays coolant onto the workpiece 17 that is held between the headstock 12 and tailstock 13 of the work holder 11 and is rotated by the spindle 14 while its peripheral surface is treated by the grinding tool or tools 9 on the spindle 6.

The purpose of the actuating means or trip 49 and of the proximity detector 54 is to ensure that the control unit 21 can detect the presence of an improper pattern 42 in the vessel 43 of the depository 41. Thus, the actuating means 49 of each of a series of different patterns can be designed to cause actuation of different proximity detectors, and the illustrated detector 54 is designed to respond only to the presence of a trip 49 which forms part of a pattern 42 corresponding to workpieces 17 which are to be treated in the grinding machine 1. This reduces the likelihood of improper treatment of a shorter or longer series of workpieces. Workpieces 17 do not carry any actuating means for the proximity detector 54, i.e., unintentional placing of a workpiece 17 into the vessel 43 causes the detector 54 to transmit a signal (e.g., by not transmitting the anticipated signal) which is evaluated by the control unit 21 and results in the generation of a visible or audible signal or in stoppage of the grinding machine.

The vessel 43 is mounted on a bracket 47 which is secured to the carriage 4. Thus, the depository 41 is located at a fixed distance from the headstock 12.

The sensors 19 and 19a of the measuring device 18 undergo pronounced wear as a result of more or less extensive contact with rotating workpieces 17 at the grinding station 10. In the absence of adequate compensation, such wear entails a departure of the dimensions of treated workpieces from the desired or optimum dimensions, and the deviation increases with progressing wear upon the one and/or other sensor. Thus, a number of finished workpieces must be discarded if the departure of the dimensions of the sensors 19, 19a from optimum dimensions is not detected in time. Conventional modes of testing the sensors were described above.

In accordance with the present invention, the sensors 19 and 19a are tested (i.e., the measuring device 18 is calibrated or adjusted) in the following way:

When the grinding machine 1 is in use, the control unit 21 transmits a series of signals which cause the gripper 37b on the trolley 33 to withdraw a freshly delivered untreated workpiece 17 from the conveyor 29 of the work supplying unit 28 and the drive for the trolley 33 is then actuated to advance the trolley along the guide rail 26 to the grinding station 10. At the station 10, the other gripper 37a is caused to descend and to engage and remove from the work holder 11 the freshly treated workpiece 17 (for example, the center 16a of or the entire tailstock 13 can be retracted to release the freshly finished workpiece). As soon as the freshly finished workpiece 17 is removed from the holder 11, the gripper 37b is caused to lower the freshly delivered untreated workpiece into the space between the headstock 12 and the tailstock 13 so that the workpiece can be engaged by the parts 14a, 16a in a predetermined position which is best suited for starting the material removing operation. In the next step, the drive for the trolley 33 receives a signal to advance the trolley to the work removing unit 31 where the gripper 37a deposits the treated workpiece onto the conveyor 32 for transport to storage or to the next processing station. The same cycle is thereupon repeated as soon as or after the trolley 33 advances from the work removing unit 31 to the work supplying unit 28 where the gripper 37b is ready to lift an untreated workpiece 17 off the conveyor 29.

The length of intervals during which the gripper 37b is caused to transport a series of untreated workpieces 17 from the conveyor 29 to the work holder 11 and the gripper 37a is caused to transport a series of treated workpieces from the station 10 to the conveyor 32 is determined by the programming of the control unit 21. When the latter transmits an appropriate signal, the condition of the sensors 19, 19a forming part of the measuring device 18 is tested in the following way: The gripper 37b lifts an untreated workpiece 17 from the conveyor 29 of the work supplying unit 28 in the customary way. However, such untreated workpiece is not delivered to the work holder 11 but rather only to the depository 41 for the properly oriented and positioned pattern 42. When the trolley 33 reaches the station 39, the gripper 37a is caused to engage and lift the pattern 42 out of the vessel 43 (the temperature of the pattern then matches the preselected value which is determined by the temperature of the circulating fluid medium) before the gripper 37b deposits the untreated workpiece 17 in the vessel 43 in a position which is determined by the notches 46 of the supports 44.

The trolley 33 is thereupon advanced to the grinding station 10 where the gripper 37b lifts the finished workpiece 17 out of the work holder 11 and the work holder thereupon receives the pattern 42 from the gripper 37a. In the next step, the control unit 21 causes the sensors 19, 19a to contact selected portions of the pattern 42 in the work holder 11 and to transmit appropriate signals to the control unit 21 which processes such signals in order to ascertain whether or not the grinding operation necessitates an adjustment in order to compensate for wear upon the sensor 19 and/or 19a. Such testing or monitoring of the measuring device 18 preferably takes place while the drive for the trolley 33 is set in motion again to advance the trolley from the station 10 to the station 39 so that the gripper 37a can remove the previously deposited untreated workpiece 17 from the vessel 43 and the gripper 37b thereupon deposits the freshly treated workpiece which has been advanced from the work holder 11 to the station 39. The trolley 33 is thereupon caused to return to the station 10 where the gripper 37b removes the pattern 42 from the work holder 11 and the latter thereupon receives the fresh workpiece from the gripper 37a. In other words, the fresh workpiece 17 reaches the work holder 11 after a certain period of dwell in the vessel 43 of the depository 41 for the pattern 42. The trolley 33 then advances from the station 10 to the station 39 where the gripper 37a removes the finished workpiece 17 from the vessel 43 and the gripper 37b thereupon deposits the pattern 42 onto the supports 44 so that selected portions of the pattern enter the notches 46 and the trip 49 enters the gap 51 of the beam 50. The spaced-apart positions of the two halves of the gripper 37b at the station 39 are shown in FIG. 4 by phantom lines, as at 37c. The trolley 33 is then caused to advance along the guide rail 26 to a position in which the treated workpiece can be deposited (by the gripper 37a) onto the conveyor 32 of the work receiving unit 31. In the meantime, the workpiece 17 which is mounted in the work holder 11 rotates about the axis 27 and is treated by the grinding tool or tools 9. On its way from the work receiving unit 31, the gripper 37b lifts a fresh workpiece 17 off the conveyor 29 and the aforedescribed procedure of treating a series of workpieces is resumed until after elapse of the interval which is selected by the control unit 21, i.e., when the control unit determines that the trolley 33 should stop at the station 39 in order to deposit an untreated workpiece in the vessel 43 subsequent to withdrawal of the pattern 42.

It will be seen that the improved method and machine allow for a harmonious integration of periodic testing of the measuring device 18 into the normal operation of the grinding machine 1 so that the testing takes up little time and the pattern 42 can be stored at a desired distance from the work holder 11 at a location where it cannot interfere with access to the grinding station 10. Each testing of the measuring device 18 entails a very short interruption of normal operation of the grinding machine, i.e., only the interval which is required to exchange a fresh (untreated) workpiece 17 for the pattern 42 at the station 39, to deliver the pattern from the station 39 to the station 10, to exchange the pattern for the finished workpiece at the station 10, to transport the finished workpiece from the station 10 to the station 39, to exchange the finished workpiece with the untreated workpiece at the station 39, to advance the unfinished workpiece from the station 39 to the station 10, to replace the pattern with the fresh workpiece, to advance the pattern to the station 39, and to exchange the pattern for the finished workpiece so that the pattern reassumes the position which is shown in FIGS. 3 and 4. The interruption is or can be shortened due to the fact that the workpiece 17 which is mounted in the work holder 11 can be treated by the grinding tool or tools 9 while the pattern 42 is in the process of returning to and reentering the vessel 43 and also because workpiece can be treated at the station 10 while the pattern is being removed from the vessel 43 and transported to the station 10. It has been found that periodic testing of the measuring device 18 in the aforedescribed manner entails only a negligible reduction of the output of the grinding machine but ensures that all deviations of the dimensions of the sensors 19, 19a from standard or optimum values can be detected well ahead of the time when such deviations could cause the making of defective workpieces or the making of a shorter or longer series of workpieces which are sufficiently defective to qualify as rejects.

Another important advantage of the improved method and machine is that the depository 41 for the pattern 42 can be installed at any one of a number of desired distances from the grinding station 10. This renders it possible to select the position of the vessel 43 in such a way that the pattern 42 which is stored therein cannot be affected by contaminants which are likely to be found in the atmosphere at and around the grinding station 10. For example, the depository 41 can be placed at such a distance from the work holder 11 that sprays of water or another coolant which are directed against the workpiece 17 between the parts 12 and 13 of the work holder 11 cannot affect the temperature and/or the dimensions of the pattern 42, at least while the latter is properly oriented and positioned on the supports 44. Any fluctuations of temperature which are likely to occur in a grinding machine have no effect upon the dimensions of the pattern 42, at least while the pattern is stored in the vessel 43. All that is necessary is to regulate the temperature of the liquid medium which is admitted via conduit 52 to fill the vessel 43 to the level of the conduit 53.

An additional important advantage of the improved method and machine is that the machine need not be equipped with discrete means for transporting the pattern 42 to and from the grinding station and/or with discrete means for transporting the sensors 19, 19a into the range of the pattern. The transporting means for the workpieces 17 also performs the function of conveying the pattern 42 between the stations 10 and 39. The sequence in which the drive for the trolley 33 is actuated and in which the motors 40 for the two grippers 37a, 37b are actuated can be readily selected in such a way that the testing of the measuring device 18 is completed within a very short period of time which is determined primarily by the interval that is required to move the sensors 19, 19a into and from contact with selected portions of the pattern 42 while the latter is mounted in the work holder 11 in lieu of a workpiece. However, it is equally within the purview of the invention to increase or reduce the number of grippers on the trolley 33 or on another suitable work transporting vehicle. If the number of grippers is reduced to one, the intervals which are required to transport the pattern 42 from and back to the station 39 are somewhat longer.

It is further within the purview of the invention to install the depository 41 at a location which is not adjacent to a portion of a straight path from the units 28, 31 to the station 10 and vice versa. For example, it is possible that the design of the grinding machine is such as to necessitate the placing of the vessel 43 at a location which is at least slightly remote from the straight path defined by the guide rail 26. The grinding machine is then equipped with a more complex drive for the trolley 33 or another work transporting device, i.e., the trolley must perform a movement away from its normal path in order to pick up the pattern as well as to return the pattern to the depository. The illustrated positioning of the depository 41 is preferred at this time because it contributes to simplicity as well as to higher output of the grinding machine.

The feature of utilizing the circulating liquid coolant as a means for maintaining the pattern 42 in the vessel 43 at a predetermined temperature or within a predetermined range of temperatures is desirable and advantageous because the liquid coolant normally also determines the temperature of the workpiece which is held by the parts 14a, 16a and is treated by one or more grinding tools 7. Eventual fluctuations of temperature in certain parts of the grinding machine have little or no influence on the accuracy of the grinding operation if the pattern 42 in the vessel 43 is maintained at a preselected temperature; this also contributes to higher accuracy of treatment of a short or long series of workpieces.

The control unit 21 is preferably adjustable (in a manner which forms no part of the invention and depends, to a certain extent, on the design of the control unit) so as to allow for changes in the number of workpieces which are treated between successive testing operations. The length of such intervals can be selected in dependency on the anticipated extent of wear upon the sensors 19, 19a in response to monitoring of a single workpiece or a preselected number of successively treated workpieces.

The signals which are generated by the sensors 19, 19a during contact with selected portions of the pattern 42 at the grinding station 10 are processed by the control unit 21 and are used to carry out all necessary adjustments including replacement of totally or excessively spent sensors, stoppage of the grinding machine to allow for replacement of sensors and/or adjustment of the rate of penetration of one or more grinding tools into the workpiece at the station 10. In other words, signals which are generated by the sensors 19, 19a during engagement with the pattern 42 can be used as reference signals during the treatment of a series of workpieces following completion of a testing operation.

While it is possible to select for the pattern 42 in the vessel 43 an orientation and axial positioning other than those shown in FIGS. 3 and 4, the aforedescribed orientation and positioning (so that the axis 48 of the properly stored pattern 42 coincides with the axis 27 of the workpiece 17 at the grinding station 10) is preferred at this time because the means for moving the grippers 37a, 37b for the purpose of engaging or depositing workpieces 17 can be used, without any alterations, to pick up the pattern from and to deposit the pattern in the vessel 43. The trip 49 and the proximity detector 54 constitute a rather simple but highly effective means for ensuring that the vessel 43 stores a proper pattern, namely a pattern whose dimensions match the ideal dimensions of a treated workpiece. Of course, other types of means for monitoring or detecting the position and type of pattern in the vessel 43 can be used with equal or similar advantage. For example, the detector means can comprise one or more photocells or one or more mechanical sensors.

Still further, the path along which the trolley 33 advances between the units 28, 31 and the grinding station 10 need not be a straight linear path. However, the illustrated design of guide means (26) for the trolley 33 is preferred at this time because it allows for a shortening of the interval of transport of workpieces between the station 10 and the units 28, 31 as well as because the trolley 33 and the parts which are mounted thereon are out of the way or can be moved out of the way when the operators desire to gain access to the grinding station. The construction and operation of the work transporting device are especially simple due to the fact that the illustrated grippers 37a and 37b are designed to move radially of the axis 27 of the workpiece 17 at the station 10. A grinding machine wherein the trolley for workpieces is reciprocable along a straight path and wherein the gripper or grippers for workpieces are movable radially of the axis of the workpiece at the grinding station can complete the automatic exchange of workpieces at the grinding station with a minimal loss of time and thus increases the output of the machine. It has been found that a grinding machine employing the illustrated work transporting means is especially suited for operation in accordance with the present invention, i.e., with a pattern which can be transported to and from the grinding station, preferably by the work transporting unit.

All dimensions of the pattern may but need not necessarily match those of an ideal finished workpiece. All that normally counts is to use a pattern having at least one portlion whose diameter is defined and known. Such portion is contacted by the sensors of the measuring device in the course of the calibrating operation. The known diameter of this portion is the reference value for the calibration of the measuring device.

It is desirable to use a pattern which is dimensioned in such a way that it can be engaged by the gripper 37a or 37b in the same way as a finished or untreated workpiece. This renders it possible to utilize the grippers for automatic manipulation of the pattern without any adjustments.

Still further, it is desirable to use a pattern whose axial length matches that of a workpiece so that the pattern can be held between the headstock and the tailstock in the same way as a finished or untreated workpiece.

A measuring device which can be used in the grinding machine of the present invention is known as DIATRONIC and is distributed by the assignee of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A circular grinding machine comprising a tool holder and a work holder defining a grinding station; means for transporting a series of rotary workpieces to and from said work holder so that successive workpieces are treated at said station by the tool which is mounted in said tool holder; a measuring device having sensor means arranged to monitor the dimensions of at least some workpieces of said series in the work holder and to generate signals denoting the dimensions of monitored workpieces; a pattern having at least one defined diameter, said transporting means comprising means for conveying the pattern to and from said work holder subsequent to treatment of preselected numbers of workpieces and in lieu of an untreated workpiece so that the dimensions of the pattern can be monitored by said sensor means while the pattern is held by said work holder and the signals which are generated by said sensor means as a result of monitoring of the pattern can be compared with signals denoting the dimensions of treated workpieces, said transporting means defining a predetermined path for the workpieces; and a depository for said pattern, said depository being adjacent to a predetermined portion of said path and comprising means for locating the pattern in a predetermined axial position and detector means for generating signals only when the pattern assumes such predetermined axial position.

2. The machine of claim 1, wherein said depository comprises means for locating the pattern in a predetermined position.

3. The machine of claim 1, further comprising control means for regulating the operation of said transporting means and the frequency at which said pattern is conveyed from said depository to said work holder.

4. The machine of claim 3, wherein said sensor means is arranged to transmit signals to said control means.

5. The machine of claim 1, wherein said depository includes means for locating the pattern in such orientation that the axis of rotation of the pattern is parallel with the axis of rotation of the workpiece in said work holder.

6. The machine of claim 5, wherein the axis of rotation of the pattern in said depository coincides with the axis of rotation of the workpiece in said work holder.

7. The machine of claim 1, wherein said pattern includes actuating means for effecting the generation of signals by said detector means in said predetermined axial position of the pattern.

8. The machine of claim 7, wherein said actuating means includes an annular member on said pattern.

9. The machine of claim 8, wherein said detector means includes a proximity detector.

10. The machine of claim 1, wherein said transporting means comprises guide means defining said path and a vehicle arranged to travel along said guide means.

11. The machine of claim 10, wherein said path includes a portion which is at least substantially parallel with the axis of rotation of the workpiece at said station.

12. The machine of claim 10, wherein said vehicle comprises a plurality of mobile grippers each of which is arranged to releasably hold a workpiece and at least one of which is arranged to releasably hold said pattern.

13. The machine of claim 12, wherein said vehicle further comprises means for moving at least one of said grippers at least substantially radially of the axis of the workpiece which is held by said work holder.

14. The machine of claim 10, further comprising a source of untreated workpieces, said source being adjacent to a predetermined portion of said path.

15. The machine of claim 10, further comprising means for receiving treated workpieces from said vehicle, said receiving means being adjacent to a predetermined portion of said path.

16. The machine of claim 10, wherein said path is located at a level above said grinding station.

17. The machine of claim 10, further comprising control means receiving signals from said sensor means and including means for regulating the operation of said vehicle, said vehicle being arranged to deliver untreated workpieces to and from said station and said depository, to deliver treated workpieces to and from said station and said depository, and to convey the pattern between said station and said depository.

18. The machine of claim 10, wherein said path is an at least substantially straight path.

19. A circular grinding machine comprising a tool holder and a work holder defining a grinding station; means for transporting a series of rotary workpieces to and from said work holder so that successive workpieces are treated at said station by the tool which is mounted in said tool holder; a measuring device having sensor means arranged to monitor the dimensions of at least some workpieces of said series in the work holder and to generate signals denoting the dimensions of monitored workpieces; a pattern having at least one defined diameter, said transporting means comprising means for conveying the pattern to and from said work holder subsequent to treatment of preselected numbers of workpieces and in lieu of an untreated workpiece so that the dimensions of the pattern can be monitored by said sensor means while the pattern is held by said work holder and the signals which are generated by said sensor means as a result of monitoring of the pattern can be compared with signals denoting the dimensions of treated workpieces, said transporting means defining a predetermined path for the workpieces; a depository for said pattern, said depository being adjacent to a predetermined portion of said path and comprising a vessel for said pattern; and means for circulating a coolant through said vessel so that the pattern is maintained at a predetermined temperature while it is being held in said vessel.

20. The machine of claim 19, wherein said circulating means includes means for cooling the workpiece which is held by said work holder.

21. A circular grinding machine comprising a tool holder and a work holder defining a grinding station; means for transporting a series of rotary workpieces to and from said work holder so that successive workpieces are treated at said station by the tool which is mounted in said tool holder; a measuring device having sensor means arranged to monitor the dimensions of at least some workpieces of said series in the work holder and to generate signals denoting the dimensions of monitored workpieces; a pattern having at least one defined diameter, said transporting means comprising means for conveying the pattern to and from said work holder subsequent to treatment of preselected numbers of workpieces and in lieu of an untreated workpiece so that the dimensions of the pattern can be monitored by said sensor means while the pattern is held by said work holder and the signals which are generated by said sensor means as a result of monitoring of the pattern can be compared with signals denoting the dimensions of treated workpieces, said transporting means defining a predetermined path for the workpieces; and a depository for said pattern, said depository being adjacent to a predetermined portion of said path, said pattern comprising an actuator and said depository comprising means which is arranged to generate signals in response to detection of the actuator in said depository.

* * * * *